United States Patent [19]
Hulbert et al.

[11] Patent Number: 4,765,892
[45] Date of Patent: Aug. 23, 1988

[54] SAND FILTER MEDIA AND AN IMPROVED METHOD OF PURIFYING WATER

[75] Inventors: Matthew H. Hulbert; James W. Currier, both of Terre Haute, Ind.

[73] Assignee: Applied Industrial Materials Corporation, Deerfield, Ill.

[21] Appl. No.: 86,222

[22] Filed: Aug. 14, 1987

Related U.S. Application Data

[60] Continuation of Ser. No. 880,065, Jun. 30, 1986, abandoned, which is a division of Ser. No. 645,207, Aug. 29, 1984, abandoned.

[51] Int. Cl.⁴ .......................................... B01D 23/16
[52] U.S. Cl. ................................................. 210/290
[58] Field of Search ....................... 210/663, 792–796, 210/807, 275–279, 283, 284, 290, 502.1, 503

[56] References Cited

U.S. PATENT DOCUMENTS

| | | | |
|---|---|---|---|
| 1,745,563 | 2/1930 | Turner | 210/290 |
| 3,723,308 | 3/1973 | Breck | 210/681 |
| 4,237,002 | 12/1980 | Strudgeon et al. | 210/189 |

*Primary Examiner*—Ivars Cintins
*Attorney, Agent, or Firm*—George H. Gerstman

[57] ABSTRACT

A slow sand filtering system is disclosed, in which an uncovered filter tank has therein a layer of sand, and an effective filter-enhancing amount of zeolite. The zeolite is topped by a growth of schmutzdecke, with the schmutzdecke comprising a layer of living organism selected from the group consisting of algae, plankton, diatoms, protozoa, rotifers and bacteria.

5 Claims, 12 Drawing Sheets

CROSS-SECTION OF SSF CELL IN FIELD SCALE PILOT PLANT FACILITY, SHOWING CLINOPTILOLITE LAYER.

CROSS-SECTION OF SSF CELL IN FIELD SCALE PILOT PLANT FACILITY, SHOWING CLINOPTILOLITE LAYER.

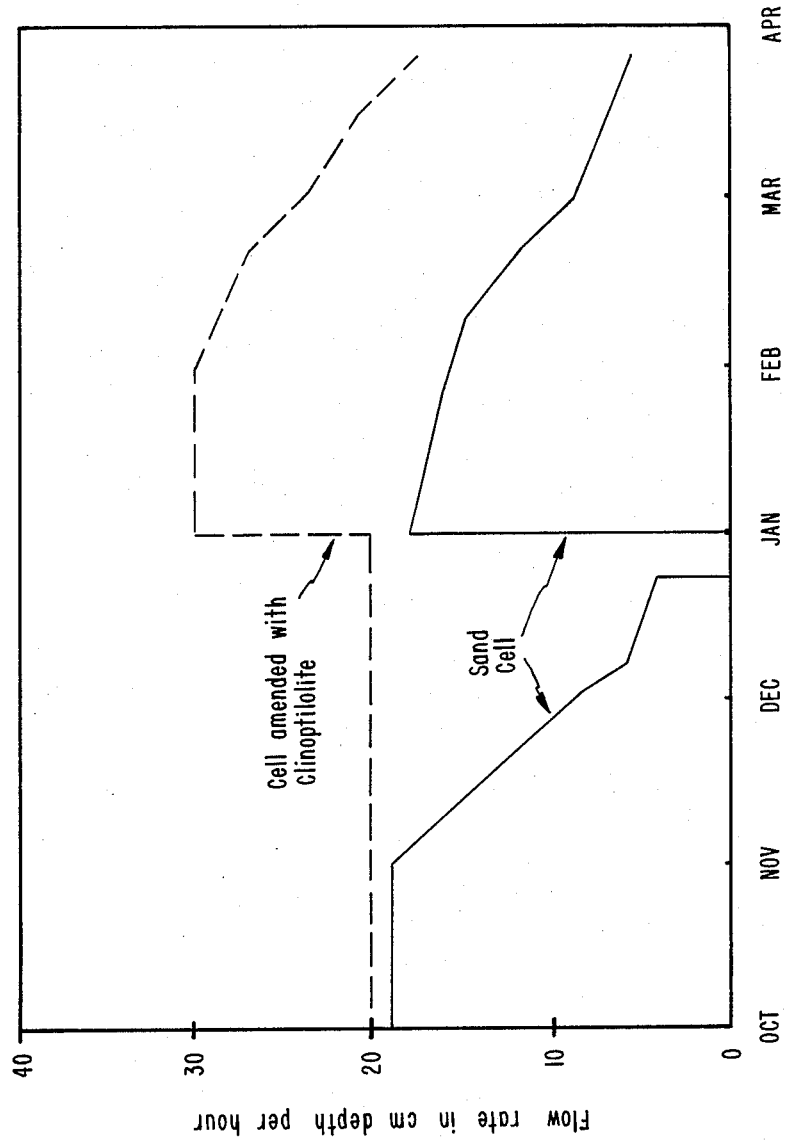

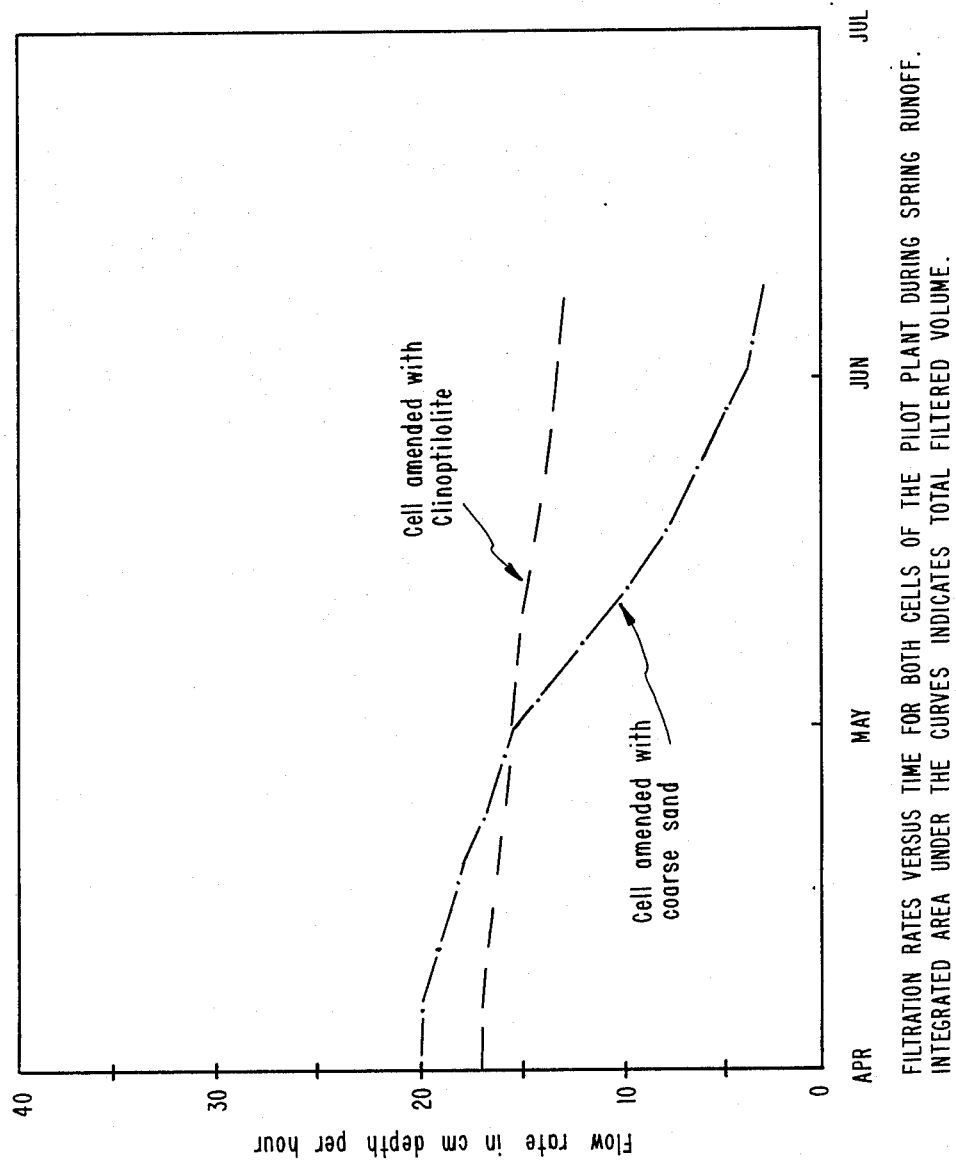

SAND FILTER MEDIA AND AN IMPROVED METHOD OF PURIFYING WATER

This application is a continuation of U.S. patent application Ser. No. 880,065, filed June 30, 1986, which is a division of U.S. application Ser. No. 645,207, filed Aug. 29, 1984, both now abandoned.

The present invention relates to sand filter media and an improved method of purifying water. In particular, the present invention provides an effective means of improving the filter rate and capacity and reducing the maintenance requirements of sand filters and a means of removing pathogenic organisms including removing Gjardia cysts from contaminated water.

Sand filtration, both slow and rapid, has long been used as a method of purifying water. In particular, the use of slow sand filtration (SSF) for providing water supply needs of small communities worldwide dates back to the early nineteenth century. For treatment rates up to 1250 cubic meters per day, SSF has been found to be less expensive than conventional "packaged treatment plants" in the United States. However, SSF technology is not widely used in the United States today, due to a perception of its limitations and a general lack of familiarity with SSF technology and costs among engineers and planners.

Primary disadvantages of SSF include: the need for relatively large land areas compared with other systems; high labor costs for scraping the filters after their useful filtering life; the requirement of a low turbidity (less than 20 nephelos turbidity units (ntu) in influent water); their marked decrease in efficiency below about 7° C.; and their tendency to freeze in northern climates. Slow sand filtration is discussed in detail in World Health Organization Publication "Slow Sand Filtration" by L. Huisman and W. E. Wood, 1974.

Zeolites are hydrated aluminosilicate minerals, are well known ion-exchange agents and are able to differentially absorb molecules in their lattice structures. Zeolites are be natural or synthetic and are usually represented by the empirical formula: $M_2/nO.Al_2O_3.xSiO_2.yH_2O$, wherein n is the cation valence, x is greater than or equal to 2 and y is the function of the porosity of the framework. Zeolites are used in industry particularly as catalysts and molecular sieves. For a general description of zeolites for industrial uses, see Dwyer et al, *Zeolites—An Introduction, Chemistry and Industry*, April, 1984.

U.S. Pat. No. 4,370,234 discloses a method and apparatus for treating waste water containing ammonia by passing the waste water over a bed of ion-exchange particles capable of exchanging ammonium and having a growth of nitrifying bacteria thereon. The waste water is preferably first oxygenated and then passed through a biological filter, solids filter and an organic filter before reaching the ion-exchange particles. Suitable ion-exchange particles disclosed in this patent include zeolites, i.e., clinoptilolite.

Horsch, C. M. and Holway, J. E., *International Committee on Natural Zeolites*, pages 229–237, (1983), disclose clinoptilolite useful as a biofilter medium in a water-reconditioning system used in a fish hatchery. Clinoptilolite was picked as the filter medium because of its known ability to remove ammonia nitrogen ($NH_4^+$) from water.

Of recent concern, particularly in the western United States, has been the contamination of surface water with Giardia cysts. Specifically, cysts of *Giardia lambilia*, a protozoan carried by animals in the range have been found as a contaminant in surface waters. The cysts are resistant to chlorination treatment and have been reported to pass through traditional slow sand filters.

The object of the present invention is to remedy some of the disadvantages associated with sand filtration by providing: longer filter life cycles with an increased filtration rate; a greater filter efficiency especially at temperatures under 7° C.; a filtering system less prone to freezing under severe winter conditions; bateriologically cleaner effluent; a lower turbidity effluent; lower start-up and maintenance costs; and an effective means of removing pathogenic organisms including Giardia cysts from contaminated water.

The present invention provides a sand filter medium comprising sand and an effective filter-enhancing amount of a zeolite. The zeolite can be added onto the top of a conventional sand filter medium, or alternatively, the new sand filter medium can be prepared by mixing zeolite and a conventional sand filter medium whereby the zeolite is uniformly dispersed throughout the sand filter medium.

The present invention also is directed to a method of purifying water by passing water through the new sand filter medium described above.

Of particular interest in the practice of the present invention is a new slow sand filter medium containing a top layer of zeolite and a bottom layer of sand. This new slow sand filter medium is employed in water treatment plants for purifying raw water for commercial or home use. This new slow sand filter media provides advantages over conventional slow sand filter media. These advantages include: a longer filter life cycle; a lower turbidity effluent; bacteriologically cleaner water, especially when influent water temperatures are below 7° C.; operation under severe winter conditions with a minimal risk of freezing; and an effective means for removing Giardia cysts from contaminated influent water.

Also of particular interest is a rapid sand filter containing a top zeolite layer and a bottom sand layer whereby the two layers are formed in situ after backflushing of the filter medium due to the difference in densities between sand and zeolite.

BRIEF DESCRIPTION OF THE DRAWINGS

FIG. 3 is a graph of filtration rates during winter operation of SSF.

FIG. 4 is a graph of filtration rates during spring runoff.

DETAILED DESCRIPTION OF THE INVENTION

Figure 1:
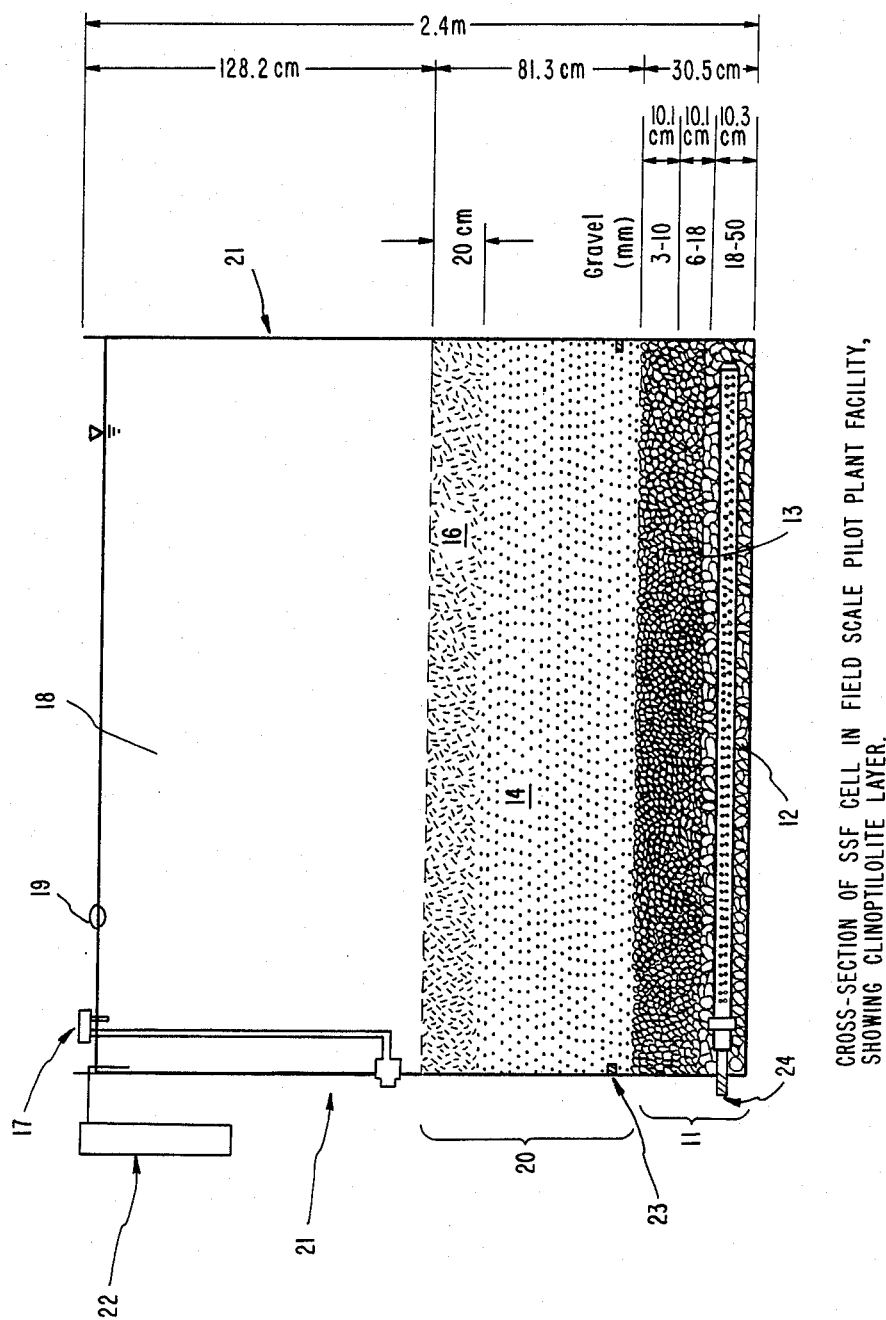
FIG. 1 is a cross sectional view of a slow sand filter.

In practicing the present invention, a zeolite and sand are employed in preparing a sand filter medium. The zeolite is employed in an amount effective to increase the efficiency of the sand filter medium. The balance of the new sand filter medium will be a silica sand and/or any other ingredients present in conventional sand filter media. The zeolite is mixed with the sand to form a uniform dispersion of zeolite in the sand, but preferably the zeolite is added on top of the sand to form a first water-contacting zone comprising up to about one-half of the total depth of the slow sand filter medium. The zeolite may comprise more than one-half of the total depth of the sand filter medium, but is uneconomical to do so. The minimum effective amount of zeolite added as a first water-contacting zone is that amount of zeolite needed to form a thin layer on top of the sand sufficient to cover the sand.

Zeolites employed in the practice of the present invention can be any synthetic or natural zeolite. Mixtures of different zeolites are also employed. The exact nature of the zeolite employed is not critical to the practice of the present invention. When clinoptilolite is employed as the zeolite it will advantageously have a cationic exchange capacity greater than or equal to about 180 and a dry attrition resistance of less than 15% by ASTM standards for best results.

Synthetic zeolites contemplated by the present invention include: the A series zeolites, such as LINDE® zeolite 4-A; the X series zeolites, such as, LINDE® zeolite 13-X; the Y series zeolites, and the pentasils, such as, ZSM-5 and ZSM-11.

Natural zeolites employed in the practice of the present invention include: the analcime group of zeolites, such as, analcime and wairakite; the natrolite group of zeolites, such as natrolite and thomsonite; the heulandite group of zeolites, such as, heulandite and clinoptilolite; the phillipsite group of zeolites, such as, phillipisite and zeolite Na-P; the mordenite group of zeolites, such as, mordenite and ferrierite; the chabazite group of zeolites, such as, chabazite, erionite and zeolite L; and the laumontite group of zeolites, such as, laumontite. Preferred natural zeolites include clinoptilolite, phillipsite and mordenite with clinoptilolite being especially preferred. The particle size of the zeolites is not critical to the practice of the present invention. Usually, however, the zeolite particles will range in size from about 80 mesh up to about 6 mesh. Zeolite materials having a particle size of about 40 mesh and a tortuous or intricate surface morphologies are preferred.

The sand used in the practice of the present invention is any sand employed in conventional sand filters, such as, for example, silica sand, construction sand or builders sand. In the absence of suitable sand source, other granular substances such as crushed coral or burnt rice husk can be substituted for the sand. As the amounts of sand required are large, it is common to employ ungraded material as excavated from natural deposits. In rapid sand filtration, ungraded medium would result in the stratification of the material upon backwashing. Therefore, in rapid sand filtration a graded material is advantageously employed. Such a graded material should have a coefficient of uniformity of less than 3 and preferably less than 2 and an effective grain size of from about 0.6 to about 2.0 mm.

In slow sand filtration, fine sand is usually employed and the designed rate of downward flow of water under treatment normally lies between about 0.1 and about 0.4 meters per hour. In rapid sand filtration, a coarser sand is employed and the design rate of downward flow of the water under treatment normally lies between about 5 and about 15 meters per hour. The effective grain size of the coarse sand used in rapid filtration should be from about 0.6 to about 2 millimeters in diameter. The sand filtration techniques are discussed in detail in World Health Organization Publication titled "Slow Sand Filtration" by L. Huisman and W. E. Wood, 1974.

In one embodiment of the present invention, a slow sand filter is prepared by adding an effective filter enhancing amount of a zeolite onto the top of fine ungraded sand. The zeolite layer creates a first water-contacting zone comprising up to about one-half of the total depth of the slow sand filter medium. Preferably, the zeolite is added in an amount to create a first-water contacting zone which is from about 15.24 to 45.7 cm. (about six to about eighteen inches) deep. The sand, lying underneath the zeolite, creates a second water contacting zone. In operation raw water is admitted to the space above the zeolite and flows downward under the action of gravity. Purification takes place during the downward passage of the water through the first water contacting zone, i.e., the zeolite zone which includes a schmutzdecke resting directly on top of the zeolite, and then through the second water contacting zone, i.e., the sand zone. As the water exits the second contacting zone an underdrain collects the purified water and directs it to a storage facility. The under drain is typically gravel or porous concrete which acts also as a support for the sand filter medium.

The schmutzdecke which grows on the present slow sand filter media is more prolific and enhances the filtering capacity and efficiency of the slow sand filter system. The zeolite enhances the formation of schmutzdecke which does not penetrate the zeolite or zeolite/sand structure thereby enhancing the filter capacity without blocking the physical structure of the filter media.

In a preferred embodiment of the present invention, clinoptilolite is used as the first water-contacting zone. The clinoptilolite is added on top of fine ungraded sand to form a layer from about 14.74 to about 45.7 m. (about 6 to about 18 inches) deep. The sand is from about 0.60 to about 3.04 m. (about 2 to about 10 feet) deep. The zeolite/sand slow sand filter medium is supported by an under drain consisting of gravel. The under drain collects the water and directs it to a storage tank. Water is admitted to the space above the zeolite and it flows downward under the action of gravity. Purification takes place during this downward passage first through the zeolite zone, i.e., the schmutzdecke and zeolite, and then through the sand zone. The downward flow of water under treatment is usually from about 0.1 to about 0.4 meters per hour. The exact flow rate can be set by adjusting the height of water on top of the zeolite zone or by adjustment of an effluent drain valve. In typical operations, the raw water entering the slow sand filter lies for several hours in the space immediately above the zeolite. The depth of water on top of the zeolite is usually from about 0.60 to about 2.44 m. (about 2 to about 8 feet). When the low sand filter is initially put into use, a ripening period is required in order for the schmutzdecke to form on top of the zeolite zone. The ripening period will vary and is usually complete in from about one week to about four weeks. The schmutzdecke consists of thread-like algae and numerous other forms of life, including plankton, diatoms, protozoa, rotifers and bacteria. As the schmutzdecke, or filter skin, forms with the ripening of the filter, it contributes to the screening or filter efficiency of the slowsand filter system. The schmutzdecke forms the uppermost portion of the first water-contacting zone and rests on top of the zeolite, i.e., clinoptilolite.

The raw water which is introduced into the filter system can be any untreated surface water, i.e., river water, that is acceptable for slow sand filtration. It is preferred that the raw water have a turbidity of less than 20 ntu. This is readily accomplished by directing the raw water into a sedimentation tank prior to addition into the sand filter system. If the raw water is supersaturated with air, the air should be desorbed prior to adding the raw water into the sand filter system. The use of supersaturated raw water will enhance head loss development which would be detrimental to the overall efficiency of the sand filter.

In another embodiment of the present invention, a rapid sand filter medium is prepared by adding a filter-enhancing amount of a zeolite to a conventional rapid and filter medium such as, sized sand. Advantageously, the zeolite will comprise a first water-contacting zone of from about 0.15 to about 1 m. (about 6 to about 36 inches) in depth, preferably from about about 0.30 to about 0.60 m. (12 inches to about 24 inches) in depth and more preferably about 0.05 m. (about 18 inches) in depth. More than a 1 m. (36-inch) depth of zeolite can be employed but is uneconomical. The conventional rapid sand filter medium or sand comprises a second water-contacting zone and can be from 1.52 to 3.04 m. (5 to 10 feet) in depth. A unique aspect of this rapid sand filter medium is that the first water-contacting zone and the second water-contacting zone are reformed in situ after backflushing by settlement due to the difference in density between zeolite and sand. After backflushing the denser sand will settle on the bottom while the less dense zeolite will form a layer on top of the sand provided the zeolite particles are not so much larger than the sand particle that they will increase the sedimentation order. Preferred zeolites employed in the rapid sand filter media include clinoptilolite, phillipsite and mordenite while clinoptilolite is especially preferred.

Additionally, a third water-contacting zone can be employed in the rapid sand filter media by adding to the zeolite and sand an adsorbant mineral, such as olivine, having a density heavier than sand. After backflushing, this mineral would settle first, followed by the sand and zeolite.

FIG. 1 shows a cross sectional view of an uncovered slow sand filter cell in a field-scale pilot plant facility. At the bottom of the cell is a filter medium support 11 which contains a perforated polyvinylchloride (PVC) pipe under drainage system 12. Alternatively, the under drainage system can be a false floor of porous concrete (not shown) or a system of porous or unjointed pipes. The PVC pipe 12 is surrounded and covered with graded gravel 13 to support the sand bed 14 and prevent fine grains being carried into the drainage system. Directly above the filter medium support 11 is the fine ungraded sand 14 which can be from about 0.60 to about 3.04 m. (about 2 to about 10 feet) deep. Directly above the sand layer is the zeolite 16 layer which can be up to about half the total depth of the total sand filter medium or more. Raw water or supernatant 18 is introduced into the sand filter cell by raw water inlet 17. The float valve 19 regulates the level of the supernatant 18 above the sand filter medium 20. The walls 21 of the sand filter cell are made of reinforced plastic, steel, stone, brick or concrete, according to which is most easily obtainable at the site of the cell. A temperature recorder 22 is conveniently adapted to the cell to record the water temperature of the supernatant 18. Baffles 23 are installed around the perimeter of the cell in the sand 14 zone to prevent short circuiting of water which would contaminate the effluent. The supernatant 18 provides a constant head of water above the filter medium 20 providing a pressure that carries the water through the filter. As the raw water enters the cell it passes first through the schmutzdecke, (not shown) which forms and rests on top of the zeolite, and the zeolite zone or the first water-contacting zone and then passes into the sand or second water-contacting zone. When the water exits the sand or second water-contacting zone, it is in a purified state and passes downward through the filter medium support 11 into the perforated PVC pipe under drain 12. The purified effluent then passes through the PVC pipe 12 out a discharge port 24. As the water is discharged, it is directed through a valve (not shown) to control the rate of flow and then directed into an outlet weir (not shown) which maintains a minimum water depth of the supernatant and aerates the outgoing water to some extent. From the outlet weir the water is directed into a clear water reservoir (not shown) for distribution for commercial or residential use.

The following examples illustrate the practice of the present invention, but should not be construed as limiting its scope.

EXAMPLE 1

FIELD SCALE SLOW SAND FILTER FACILITY

A field-scale slow sand filter (SSF) facility was constructed on the north bank of the Logan River in Utah. The facility consisted of a preliminary settling tank and two SSF (similar to the one shown in FIG. 1 and described hereinbefore) each three meters square, with pumps, piping, gauges and valves sufficient to maintain and regulate the flow of water through each of the filters independently. One SSF served as a control filter and the other SSF was amended with clinoptilolite. Both SSF were operable in September and were maintained through June.

The control SSF of the facility contained one meter of unsieved construction sand (10% passing a 0.18 millimeter screen and 60% passing a 0.75 millimeter screen, i.e., D-10=0.18 millimeters and uniformity coefficient (or D-10/D-60)=4.2 on a gravel filter drain. On March 29, after seven months of operation, a 15 centimeter layer of quartz sand (+0.6 millimeter diameter) was placed on the surface of the control SSF after its surface had been scraped. The zeolite SSF contained 80 centimeters of construction sand identical to that in the control SSF covered by a 20 centimeter layer of clinoptilolite graded to a consistency of 0.7 to 1.7 millimeter diameter. When freezing was not a problem, raw water was pumped from the Logan River into the preliminary settling tank and flowed by gravity into both filters, where the water level was controlled by flow valves. When freezing was a problem, raw water was pumped directly into the filter tanks and flow rates were controlled manually. Water flowed by gravity through the filters and into a V-notched weir box, where samples were taken for water quality analysis.

TEMPERATURE RECORDINGS

Strip chart thermographs were installed at the facility and were to provide a continuous record of air and water temperatures. A Weather-Hawk seven day remote sensing thermograph was used for continuous monitoring of the effluent water temperatures. Air temperatures were monitored using a spring-loaded thermograph mounted in a box under the railing on the side of the filters. A gap of 30 centimeters was left between the box and the side of the tank to minimize interference from the temperature of the water in the filter. Recordings were taken on weekly strip charts beginning in September and continuing until April.

The raw water temperature at the facility was 10° C. on the first of October and decreased with minor fluctuations to a 3° C. on the first of December. Diurnal variations were generally on the order of ±1° C. The water temperature fluctuated between 1.5 and 3.5° C. until the first of April, when it began to rise. By the first of May it was approximately 8° C. and remained at about that level throughout the remainder of the spring runoff.

The lowest air temperature measured during the winter was 29° F. on the 17th of January. From about the first of December to about the first of March there was always a layer of ice on the surface of the supernatant in the filters, but they continued to function.

AMMONIUM REDUCTION

Ammonium chloride was added to the supernatants of both SSF of the facility on the 7th of June to determine ammonium removal efficiencies for each SSF. A solution containing 220 grams of ammonium chloride and 20 liters of water was added to each SSF of the facility, resulting in the supernatant solution containing approximately 5 milligrams per liter of ammonium nitrogen. A control solution of 5 milligrams per liter of ammonium nitrogen was also kept at 12° C. and sampled initially and at 24 hours for ammonium. This was done to determine whether desorption to the atmosphere might cause significant reductions in the ammonium concentrations. Effluent samples from both cells were taken initially, and at 2, 4, 6, 9, 13, 24, 48 and 72 hours. The effluent samples were analyzed for ammonium nitrogen and nitrate nitrogen content. An influent sample was also taken before the addition of the ammonium chloride to allow a determination of background levels of ammonium and nitrate.

No effluent sample from either SSF of the facility contained levels of ammonium nitrogen above 10 micrograms per liter (ug/l), which is the detection limit for the low level indophenol ammonia test. The background level of ammoniumnitrogen in the influent water was determined to be 100 ug/l. The ammonium nitrogen level in the Logan River was given as 11 micrograms per liter by McConnell, L. K., *Master's Thesis*, Utah State University, Logan, Utah, 1984.

Nitrate results, indicate that the nitrate nitrogen concentration leaving the zeolite cell was essentially constant at 0.5 milligrams per liter (mg/l). The concentration of nitrate nitrogen leaving the control SSF rose from a 24-hour value of 0.26 mg/l to a 72 hour value of 1.2 mg/l. At this time the flow rates through the SSF were approximately 13 centimeters per hour (cm/hr) for the zeolite SSF and 3 centimeters per hour for the control SSF. The difference in the flow was due to the loss of filter capacity of the control.

COLIFORM REMOVAL

The two SSF were evaluated for their effectiveness in removing coliform bacteria on two occasions. In both cases, the supernatant of each SSF was spiked with 20 liters of raw sewage and the effluent levels of coliform bacteria were monitored for several days. The first test began on March 19 when the supernatant water temperature was about 3° C. The supernatant water contaminated with sewage contained approximately 2500 coliforms per 100 ml sample. Samples were taken at 0, 2, 6, 10, 24 and 48 hours after addition of sewage and also at one week. Sample sizes ranged from 180 ml total sample volume initially, to 1830 ml at the 24 hour, 48 hour and one week samples. Flow rates through the SSF medium were 20 centimeters per hour for removing coliform bacteria in the zeolite SSF and 12 centimeters per hour for the control SSF. The second coliform removal test began on June 7, when the supernatant water temperature was about 10° C. The supernatant water with the sewage contained approximately 17,000 coliforms per 100 ml. Samples were taken at 0, 2, 4, 6, 9, 13, 24 and 48 hours. All samples were 1500 ml is size. Flow rates through the SSF medium were 13 centimeters per hour for the zeolite SSF and 3 centimeters per hour for the control SSF. Analysis for coliform bacteria was performed using the membrane filter technique as given in *Standard Methods for the Examination of Water and Waste Water*, 15th Edition, 1980, Section 909A.

Figure 2:
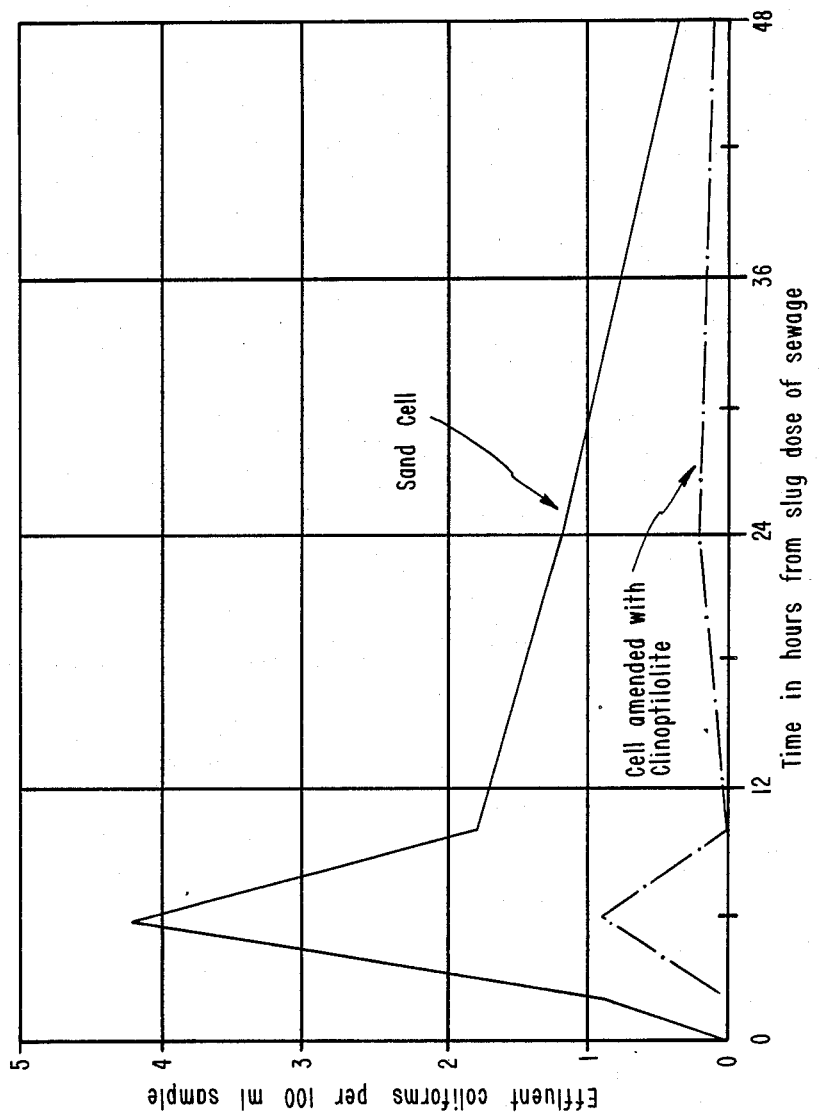
FIG. 2 is a graph of effluent coliforms per 100 ml sample.

The concentrations of coliforms detected in the filter effluents of the March test and normalized to 100 mls are shown in FIG. 2. The zeolite SSF was significantly more effective and never exceeded the drinking water standard of one coliform per 100 ml sample, maximum, while the sand cell exceeded that level from the six hour to the 24 hour test.

In the coliform removal test conducted in June, two coliforms passed the zeolite SSF while three passed the control SSF. This was out of a total sample volume for each side of 12 liters, which equates to approximately 0.02 coliforms per 100 ml. The flow rate through the control SSF was less than one-fourth the flow rate through the zeolite SSF.

VOLATILE SOLIDS STUDY

The field-scale facility was drained for scraping on the 26th of March. Before scraping, surface samples of the schmutzdecke and media were obtained from both the control SSF and the zeolite SSF using a 4.5 cm diameter plug sampler. Three different samples were taken from each SSF: (1) schmutzdecke with as little underlying medium as possible; (2) the medium immediately under the schmutzdecke but with no visible schmutzdecke included; and (3) samples of medium and schmutzdecke combined with no division at the interface. All samples were dried at 103° C. overnight and weighed. The samples were heated in a muffle furnace to a temperature of 550° C. for one hour, cooled in a dessicator and weighed again to determine the weight that had been driven off in the muffle furnace. Control samples of clean sand and clinoptilolite were treated similarly to determine if there was any weight loss not attributable to biological matter.

The weight loss of the 4.5 cm diameter sample plugs differed markedly between the surface of the sand and that of the clinoptilolite. The plugs from the surface of the clinoptilolite decreased in weight from 0.8 g to 2.2 g, depending on the total weight of the ashed sample which varied from 9.03 g to 25.46 g. The plugs from the surface of the sand decreased in weight from 0.36 g to 1.14 g, while the ashed sample weighed from 4.84 g to 77.28 g.

Control samples of clean sand and clinoptilolite were also ashed to determine if there was any weight loss not due to biological mass. The sand did not decrease in weight but the clinoptilolite decreased by 11% which appeared to be due to waters of hydration being driven off.

TURBIDITY REMOVAL

The turbidity levels were measured for the supernatant water and the effluent of each SSF of the facility. Samples were taken one to three times weekly from the first of October to the 20th of January and again on the 2nd of May. All samples were analyzed using a Hach Turbidimeter.

For the first three weeks after the addition of the clinoptilolite to the surface of the zeolite SSF, a large fraction of fines washed through which resulted in much higher turbidities in the effluent than in the influent (43 versus 3 ntu initially). Within three weeks, the turbidity in the effluent from the zeolite SSF decreased to a stable level of approximately 30% lower than the turbidity in the effluent from the control SSF. The turbidity of the zeolite SSF remained lower for all but one reading after that time. This was observed when flow rates through the filter were about equal, and also when the flow rates through the zeolite SSF greatly exceeded those through the control SSF. Since influent turbidity is a critical factor influencing the length of filter cycles, it is important that the zeolite SSF also had a much longer cycle and filtered much more water between scrapings. See FIG. 3. This was observed even when the control SSF had a layer of coarse sand on its surface indicating that these results are not due entirely to the coarseness of the surface material. See FIG. 4.

The nature of schmutzdecke was different on the surface of the zeolite SSF from that on the control SSF. The schmutzdecke on the surface of the control SSF appeared to be incorporated into the surface of the sand and it was not possible to separate the schmutzdecke from the sand. It fractured easily in a vertical direction and seemed to have little internal cohesion. The schmutzdecke on the surface of the zeolite, however, appeared to rest primarily on the top of the clinoptilolite and did not appear to incorporate the top layers of zeolite. It was possible to roll back a section of the schmutzdecke almost as though it were a carpet layer on top of underlying clinoptilolite.

The zeolite SSF resulted in approximately 30% lower turbidity compared to the control SSF. The filter cycle was more than twice as long with the zeolite SSF and the volume of filtered water was four times greater. Since there is as much as a hundred-fold reduction in particle counts when the turbidity is reduced from 1.0 to 0.1 ntu, maintaining a lower turbidity water results in much greater safety with respect to potential pathogenic organisms.

EXAMPLE 2

LABORATORY STUDIES IN GLASS COLUMNS

Laboratory scale glass columns were set up to examine configurations of sand and clinoptilolite and to evaluate parameters which could not be treated in the field-scale facility due to scale or cost. Each column consisted of two joints of 15 centimeter diameter glass pipe, each 152 centimeters in length. The influent water in the columns was piped in from the Logan River. Float valves were used to control the water level. Epiziometer ports were installed at 30 centimeter intervals in the lower glass pipe of ech column. Five configurations of media were placed in the columns. Column 1 contained a 20 centimeter layer of clinoptilolite on top of 100 centimeters of unsieved construction sand. Column 3 contained 105 centimeters of unsieved construction sand on top of a 15 centimeter layer of clinoptilolite. Column 2 was the same as Column 1 except that 20 cm of coarse sand was on top of 100 centimeters of construction sand. Column 4 contained a 3:1 mixture of sand:zeolite. Column 5 contained only unsieved construction sand and served as a control column. Columns 1 and 3 were used to examine the removal of lead (Pb), manganese (Mn) and arsenic (As) from influent water. Column 5 served as a control

METAL REMOVAL

No metal ions were applied to the control column. The water depth over the media was maintained to 140 centimeters. The flow rate of water through the media was 20 centimeters depth per hour, or one millimeter per second. A stock solution of lead, manganese and arsenic (as lead nitrate, manganese chloride and sodium arsenate, respectively) was prepared containing 6 milligrams/liter of each. A peristalt pump was used to feed this solution into columns 1 and 2 at a rate of 1 ml/minute. This flow rate was designed to produce a concentration of 100 ug/l of each of the metals in the supernatant water. This solution flowed through the columns for a period of 28 days. Influent samples were analyzed at 1 day and 14 days to compare actual influent metal concentrations to the expected metal concentration of 100 ug/l. Effluent water samples were taken twice weekly for metal analysis. Filter flow rates were carefully maintained at 20 centimeters per hour to establish a steady state condition.

After the four week metal application period, water was drained from the columns and samples of the media were removed from each column at the surface and at depths of 15, 30, 60, 90 and 120 centimeters. Samples were divided into three replicates and were oven dried in preparation for acid extraction. Acid extraction was performed on the three replicates of each sample. Each acid extracted replicate consisted of 20 grams of oven-dried media and 60 ml of 2 molar hydrochloric acid. Samples were shaken for 16 hours and filtered through a 0.45 micron glass filter. The replicates of each sample were then combined and analyzed for lead, manganese and arsenic using a Perkins-Elmer Inductively Coupled Plasma Emission Spectrophotometer (ICP). Dissolved arsenic and lead were below the detection limit using the ICP. Therefore, further analyses were performed for arsenic using the arsine gas generation technique as given in *Standard Methods,* supra, Section 303E to J. Lead concentrations were determined using a Varian Tectron Model AA-6 Atomic Absorption Spectrophotometer. Influent and effluent manganese, lead and arsenic concentrations, in micrograms per liter, from columns 1 and 2 are listed below in Table A:

TABLE A

| Day of Experiment | Location of Sample | Column 1 Mn ug/l | Column 1 Pb ug/l | Column 1 As | Column 2 Mn ug/l | Column 2 Pb ug/l | Column 2 As |
|---|---|---|---|---|---|---|---|
| 1 | Influent | 92 | 70 | 76 | 88 | 45 | 86 |
| 12 | Influent | 118 | 25 | 44 | 139 | 74 | 83 |
| 1 | Effluent | <3 | 2 | 6.6 | 9 | <1 | 1.7 |
| 5 | Effluent | <3 | 2.5 | 31 | <3 | <1 | 54 |
| 9 | Effluent | 3 | <1 | 90 | <3 | <1 | 32 |
| 12 | Effluent | <3 | <1 | 33 | <3 | <1 | 18 |
| 16 | Effluent | 19 | 1.2 | 57 | <3 | 1.3 | 39 |
| 20 | Effluent | 13 | <1 | 84 | <3 | <1 | 55 |
| 23 | Effluent | 102 | <1 | 80 | <3 | <1 | 37 |
| 28 | Effluent | 11 | 1.7 | 78 | <3 | <1 | 37 |

Both columns were kept thoroughly stirred by air bubbling through the upper 80 centimeters of water. This stirring, combined with the supernatant detention times of approximately 7 hours, may have allowed sufficient contact time with the clinoptilolite to remove a large fraction of the lead by ion-exchange. Since the arsenic was present as an anion ($HAsO_4$), it should not have been removed by the ion-exchange with clinoptilolite which is a cation exchanger.

Effluent metal concentrations indicate that lead was consistently removed to a level of less than 3 ug/l, which is below the federally mandated maximum of 50 micrograms per lter. Manganese levels of the effluent were less than 10 micrograms per liter for the first two weeks for both columns and remained less than 10 ug/l for column 3 to the end of the four week period. In column 1, however, the effluent manganese concentrations increased.

Media concentrations in the extraction samples from the media in the columns indicate that lead and manganese were almost entirely removed in the surface layers of the columns, regardless of whether the surface layer was sand or clinoptilolite. Arsenic deposition occurred through the entire depth of the columns with the greatest concentration occurring at the surface. The results indicate that the addition of zeolite to SSF does not materially effect the removal of lead, manganese and arsenic from the influent water but the addition of a layer of clinoptilolite underneath the sand may remove a slightly higher fraction of the manganese. The Mn, As and Pb concentrations in 2 molar HCl solution extracted from the samples in the columns are listed below in ug/l.

TABLE B

| Sample Depth | Column 1 (ug/l) | Column 3 (ug/l) | Column 5 (ug/l) |
|---|---|---|---|
| Surface | Mn = 123,700 | Mn = 98,200 | Mn = 28,560 |
|  | As = 400 | As = 366 | As = 22 |
|  | Pb = 121,000 | Pb = 32,900 | Pb = 1,180 |
| 15 cm | Mn = 10,800 | Mn = 34,590 | Mn = 24,820 |
| 30 cm | Mn = 29,400 | Mn = 24,950 | Mn = 23,920 |
|  | As = 105 | As = 257 | As = 132 |
|  | Pb = 336 | Pb = 316 | Pb = 160 |
| 60 cm | Mn = 25,170 | Mn = 24,320 | Mn = 24,950 |
| 90 cm | Mn = 25,840 | Mn = 24,620 | Mn = 26,370 |
| 120 cm | Mn = 24,320 | Mn = 6,100 | Mn = 22,880 |
|  | As = 121 | As = 260 | As = 65 |
|  | Pb = 132 | Pb = 5,500 | Pb = 152 |

COLUMN HEAD LOSS STUDY

The columns were placed in service in September. Columns 2 and 3 were scraped on the 1st of February. A compressed air system was set up by the 8th of February to bubble air up through the top 80 cm of supernatant. This was done to eliminate any possibility of greater than saturation concentrations of gases being present in the water. Bubbles had been present in the surface layers of the media, and a sample of the gas comprising the bubbles was collected and analyzed on agas chromatograph. The water was also analyzed for dissolved oxygen using the Winkler technique. On the 15th of February, a record of head loss development through each column was begun by measuring the head on each pleziometer in each column three times weekly until May 1 and once every 7 to 14 days thereafter. Columns 1, 3 and 5 were taken out of service on the 12th of April for metals testing. Columns 2 and 4 remained in operation.

Head loss developed in the columns when they were first placed in operation in September. Visual inspection indicated that this was due to bubbles forming in the surface of the media rather than to schmutzdecke buildup. A sample of the gas comprising the bubbles was collected in early December and analyzed on a gas chromatograph. More than 99% of the sample consisted of oxygen and nitrogen, in approximately atmospheric concentrations, indicating that it was simply air, and not a product of biological activity. The columns with coarse media on the surface allowed larger bubbles to form, such that tapping on the column or column stand would cause them to escape and rise to the surface. This was apparently the reason that the columns with a surface layer of coarse media continued to function with only small head loss during this period.

At the same time that the gas samples were collected, water samples were also collected and analyzed for dissolved oxygen. The dissolved oxygen concentration in the influent was found to be 9.1 mg/l. Atmospheric pressure in Logan, Utah, is 645 mm mercury, so dissolved oxygen sauration should be $(645/760) \times 9.5 = 8.06$ mg/l. The effluent oxygen concentration was found to be 8.0 mg/l. Therefore, it appears that the water was entering the columns supersaturated with oxygen (and nitrogen) and that these gases were coming out of solution in the surface layers of the media.

Head loss development with time at 15 cm depth in the columns, and at 105 cm depth was studied. Rapid fluctuations occurred in the first ten days of record are a result of inaccurate adjustment of the compressed air, which resulted in a lack of air stripping for 1-2 days on two different occasions. The rapid increases in head loss were observed to be a result of bubble formation.

Head loss at 15 cm dropped from 100+ cm on the 8th of February to a range of 12 to 21 cm on the 15th of February. This was the direct result of stripping the supersaturated air from the water, which allowed the bubbles in the surface layer of the media (at a greater depth and, therefore, pressure) to dissolve and reduce the head loss. A decrease in head loss occurred over the first 8 days of readings at 105 cm was is due to the fact that the process of bubble dissolution was not complete when head loss readings were begun. Head loss then built up with time due to the deposition of influent turbidity and the growth of biological mass. Head loss development was much more rapid for the columns with normal filter sand on the surface than for the columns which had coarse media on the surface. This is to be expected, since small intergranular pore spaces will be filled more easily than large ones, either by gas, accumulated particles and schmutzdecke.

An intermediate rate of head loss development occurred on the filter which consisted of a homogeneous 3:1 mixture of sand and clinoptilolite.

EXAMPLE 3

ADSORPTION OF REOVIRUS TO SAND AND CLINOPTILOLITE

The adsorption of reovirus type 1 to clinoptilolite and sand was compared in a 42 hour jar test. Ten grams of washed solid media and 20 ml of Logan River water filtered through a slow rate sand filter were placed in a 125 ml Erlenmeyer flask and swirled for 42 hours at room temperature (18±2° C. Each flask contained 240,000 counts/minute Iodine-125 labeled reovirus and one of four concentrations of infectious reovirus. Each combination of media and virus concentration was tested in triplicate.

At the conclusion of 42 hours of shaking, a considerable amount of fines had been generated in both types of media. The fines in the clinoptilolite flasks were extremely fine, and remained in suspension even after standing guiescent for two days. The fines were separated from the clear supernatant by centrifugation for one hour at 2,500×g. The concentrations of reovirus in the three fractions (coarse solid media, fines and clear water) were then determined by assaying for the iodine-125 labeled reovirus in each fraction.

The reovirus was iodinated by the chloramine-T procedure described by Hunter, et al, *Nature*, 194 (4827): 495–496 (1962). Although the level of infectious virus in the iodinated reovirus tracer was very low, the concentration of reovirus particles in the tracer was significant ($1 \times 10E7$/ml after dilution in the Logan River water).

A buffer (1M glycine; 0.01M glutamic acid; 0.01M aspartic acid; and 0.05% tween 20, pH 3 0) which elutes reovirus from charge modified cellulose filters with an elution efficiency of 85% was used to elute reovirus from the sand and clinoptilolite.

The results from the virus adsorption studies are shown in Table C below. Reovirus type 1 was found to adsorb to sand and clinoptilolite with about equal efficiencies. At the end of the 42 hour batch reactor test, 76%±3% of the input reovirus was adsorbed to the clinoptilolite, and 81%±2% of the input reovirus was adsorbed to the sand. After the levels of adsorption were measured, viruses were eluted off the samples. The elution efficiency of reovirus from these solid media was quite low, 5%±4% for the sand, and 5%±1% for the clinoptilolite.

When the adsorbed reovirus was eluted from either sand or clinoptilolite, 25%±20% was still infectious.

These results are based entirely on the physico-chemical properties of the reovirus and media. In a slow sand filter the biological properties of the schmutzdecke could greatly increase removal efficiencies, but would not appear to reduce them, since the layers below the schmutzdecke would retain their physico-chemical adsorptive properties.

TABLE C

Adsorption of Reovirus to Sand and Clinoptilolite

| Media | Virus Particles/ml[a] | Distribution of Reovirus After 42 H | | |
|---|---|---|---|---|
| | | % in Water | % in Coarse Solids | % in Fines |
| Clinoptilolite | $51 \times 10^7$ | 20 ± 4 | 1.6 ± 0.5 | 78 ± 9 |
| Clinoptilolite | $6.0 \times 10^7$ | 24 ± 3 | 1.3 ± 0.2 | 75 ± 8 |
| Clinoptilolite | $1.5 \times 10^7$ | 25 ± 3 | 1.4 ± 0.3 | 73 ± 9 |
| Clinoptilolite | $1.0 \times 10^7$ | 26 ± 2 | 1.4 ± 0.3 | 72 ± 8 |
| Sand | $51 \times 10^7$ | 17 ± 2 | 16 ± 2 | 67 ± 8 |
| Sand | $6.0 \times 10^7$ | 18 ± 1 | 18 ± 1 | 63 ± 7 |
| Sand | $1.5 \times 10^7$ | 20 ± 2 | 17 ± 1 | 63 ± 4 |
| Sand | $1.0 \times 10^7$ | 20 ± 2 | 16 ± 1 | 64 ± 9 |

[a]Concentration of virus in Logan River Water at start of adsorption period.

Robeck, et al, Journal of the American Water Works Association, 54: 10: 1275, (1962), showed that attenuated poliovirus Type I was removed at about 90% efficiency in a clean sand bed 60 cm deep and at a flow rate of 4 cm/hr. When flow rates were increased to 30 cm/hr, the removal rate decreased to approximately 60%. This compares to poliovirus reductions of 3 to 5 log units in slow sand filters with sand beds 60 cm deep reported by Poynter et al, Progress in Water Technology, 9: 75 (1977). Reovirus removal rates of more than four log units were obtained in a SSF as reported by McConnell, L. K., Master's Thesis, Utah State University, Logan, Utah, (1984), after the SSF had been operating for at least one week. The variable results obtained in a clean sand bed compared to the consistent results obtained in a SSF with an active schmutzdecke indicate that the schmutzdecke is a major factor involved in virus removal, while physico-chemical absorption is highly dependent on factors such as virus type and water chemistry. Therefore, a zeolite, i.e., a clinoptilolite, SSF will improve virus removal since it encourages the development of a superior schmutzdecke.

EXAMPLE 4

BIOLOGICAL REGENERATION OF CLINOPTILOLITE

A volumetric sample of 120 ml of granulated clinoptilolite was saturated with ammonium by placing the zeolite in a solution of approximately 100 grams/liter of ammonium chloride for a period of four days and agitating the mixture occasionally. The ammonium solution was then removed, and the clinoptilolite was washed three times with deionized distilled water (DDW) and divided into three equal portions of 40 ml each. Each portion was then placed in a 1000 ml beaker. The ammonium was immediately extracted from the clinoptilolite in beaker 1 by placing it in a solution of 150 grams/liter of potassium chloride and agitating it occasionally. Beaker 2 received, in addition to the 40 ml portion of clinoptilolite, 800 ml of filtered water from the Logan River and 100 ml of settled activated sludge from the Hyrum Wastewater Treatment Plant to supply nitrifying organisms. Beaker 3 received, in addition to the 40 ml portion of clinoptilolite, 900 ml of filtered Logan River water to serve as a control on beaker 2. Samples were removed from beakers 2 and 3 at 0.25, 0.5, 1, 2, 3, 4, 6, 8 and 24 hours to be tested for nitrate concentrations. Samples were also removed at 0.25, 6 and 24 hours to measure ammonium concentrations. After 24 hours, the clinoptilolite was removed from beakers 2 and 3 and the residual ammonium was extracted using potassium chloride.

Ammonium samples were analyzed according to *Standard Methods*, supra, Section 417-C. Since levels of potassium chloride of 100 to 1500 mg/l (after dilutions) were also present in the extracted samples, standards were run with and without 1500 mg/l of potassium chloride as a control on any interference that might be present. Nitrate samples were analyzed using a Technicon Autoanalyzer 11.

The supernatant in the two beakers used in the batch reactor tes (Samples 2 and 3) contained approximately equal concentrations of ammonium throughout the test. Initially, these concentrations were 46 and 47 mg/l respectively, and at both the 6 and 24 hour tests, the concentration in both supernatants was near an average of 185 mg/l. This represents a total mass of ammonium nitrogen in the supernatant of each beaker of approximately 150 mg. After the end of the 24 hour jar tests, The remainder of the ammonium was extracted from the clinoptilolite, using potassium chloride. Both samples released 470 mg of ammonium nitrogen. When added to the amount in the supernatant, this gives a total of 620 mg released by each of samples 2 and 3. This is 12.7% higher than the control sample (Sample 1) which released 550 mg of ammonium nitrogen, but is well within the 26% standard deviation given in *Standard Methods,* supra, for ammonia analysis. The standards with 1500 mg/l of potassium chloride were within 6% of those with no potassium chloride for all ammonia concentrations tested, thus there appears to be little or no potassium or chloride interference.

Results from nitrate analysis of the supernatant in the two beakers shows a marked difference. See FIG. 12. The beaker with river water and activated sludge showed a decrease in nitrate concentration over the first six hours, no change from six to eight hours, and then a 430% increase from 8 to 24 hours. The beaker with river water showed only minor fluctuations in nitrate concentration, but was essentially constant, never exceeding 1 mg/l. This indicates that nitrifiers were present in the sludge, but that they did not become active until some time after 8 hours. The reduction in nitrate from 0 to 6 hours may be a result of a population of nitrate using bacteria which were active during this period before nitrate production began. The test was terminated at 24 hours when the ammonium in solution was approximately 40 times higher than the nitrate. Thus, it is not possible to determine whether any of the ammonium ionically bound to the clinoptilolite was utilized by the nitrifiers or whether they used only ammonium in solution.

In similar operations, the various zeolites described herein are employed in slow sand filtration and rapid sand filtration systems whereby similar results are achieved.

We claim:

1. A slow sand filtering system which comprises:
an uncovered filter tank; an inlet to said tank for water to be treated and an outlet from said tank for the treated water; said uncovered filter tank having therein a layer of sand, an effective filter-enhancing amount of zeolite, said zeolite being topped by a growth of schmutzdecke, said schmutzdecke comprising a layer of living organisms selected from the group consisting of algae, plankton, diatoms, protozoa, rotifers and bacteria.

2. A filtering system as described in claim 1, in which the zeolite is present in an amount of at least about ten percent by weight of the total sand filter medium.

3. A system as described in claim 1, in which the zeolite is from the group consisting of clinoptilolite, phillipsite or mordenite.

4. A system as described in claim 1, wherein the zeolite comprises a first water-contacting zone and the sand comprises a second water-contacting zone.

5. A system as described in claim 4, wherein the first water-contacting zeolite zone is from about six to about eighteen inches deep and the second water-contacting sand zone is from about five to about ten feet deep.

* * * * *